United States Patent
Hill et al.

(10) Patent No.: US 7,025,308 B1
(45) Date of Patent: Apr. 11, 2006

(54) APPARATUS FOR HOLDING AND POSITIONING A PIPE DURING INSTALLATION

(76) Inventors: John Hill, 5975 U.S. Highway 23, Mars Hill, NC (US) 28754; Joseph Henry Hill, 1640 Chandler Creek Rd., Mars Hill, NC (US) 28754

( * ) Notice: Subject to any disclaimer, the term of this patent is extended or adjusted under 35 U.S.C. 154(b) by 19 days.

(21) Appl. No.: 10/823,208

(22) Filed: Apr. 12, 2004

Related U.S. Application Data

(60) Provisional application No. 60/463,303, filed on Apr. 15, 2003.

(51) Int. Cl.
  *F16L 3/00* (2006.01)
  *E21F 17/02* (2006.01)
(52) U.S. Cl. .......................... 248/62; 248/59; 138/107
(58) Field of Classification Search ................. 248/62, 248/58, 59, 61, 63, 317, 323; 269/45, 46, 269/287, 296; 138/107
  See application file for complete search history.

(56) References Cited

U.S. PATENT DOCUMENTS

| | | | | |
|---|---|---|---|---|
| 247,361 A * | 9/1881 | Kane | ............................ | 248/59 |
| 497,512 A * | 5/1893 | Beaton | ........................ | 248/62 |
| 535,707 A * | 3/1895 | MacTaggart | .................. | 248/55 |
| 572,770 A * | 12/1896 | Putnam | ........................ | 211/19 |
| 844,036 A * | 2/1907 | McMurtrie | ................. | 248/68.1 |
| 1,966,899 A * | 7/1934 | McCabe | ....................... | 248/62 |
| 2,161,782 A * | 6/1939 | Flower | ........................ | 248/59 |
| 2,686,960 A | 8/1954 | Le Roy | | |
| 2,723,816 A * | 11/1955 | Drysdale | ..................... | 248/497 |
| 2,997,767 A * | 8/1961 | Grover et al. | ................ | 24/510 |
| 3,302,911 A * | 2/1967 | Bender | ......................... | 248/59 |
| 3,572,623 A * | 3/1971 | Lapp | ............................ | 248/72 |
| 3,866,871 A * | 2/1975 | Dupuy, Sr. | ................... | 248/59 |
| 4,019,705 A * | 4/1977 | Habuda et al. | ............... | 248/58 |
| 4,157,800 A | 6/1979 | Senter et al. | | |
| 4,564,182 A | 1/1986 | Svajgl | | |
| 4,570,885 A * | 2/1986 | Heath | .......................... | 248/72 |
| 4,676,472 A | 6/1987 | Kamrud, Sr. | | |
| 4,765,577 A * | 8/1988 | Collins et al. | ................ | 248/59 |
| 4,793,578 A * | 12/1988 | Howard | ....................... | 248/62 |
| 4,836,517 A | 6/1989 | Vossler | | |
| 5,024,403 A | 6/1991 | Carlston | | |
| 5,120,009 A | 6/1992 | Sasin | | |
| 5,192,059 A | 3/1993 | Silver | | |
| 5,501,544 A * | 3/1996 | Cairns | ........................ | 403/400 |
| 5,611,189 A | 3/1997 | Fleck | | |
| 5,839,703 A | 11/1998 | Tesar | | |
| 6,079,673 A | 6/2000 | Cox | | |
| 6,390,421 B1 * | 5/2002 | Rudd | .......................... | 248/68.1 |
| 6,464,180 B1 | 10/2002 | Workman | | |

* cited by examiner

*Primary Examiner*—Anita M. King
(74) *Attorney, Agent, or Firm*—Carter, Schnedler & Monteith

(57) ABSTRACT

There is provided an apparatus and method for enabling an elongated pipe to be installed below a ceiling using a single installer. A pair of rotatable jaws is provided. The jaws are adapted to temporarily support one end of a pipe. A fastener is provided for removably securing the apparatus to a ceiling. An extension device, in the form of an elongated rod, connects the jaws to the fastener so that one end of the pipe may be temporarily supported a predetermined distance from the ceiling and the installer may connect the other end of the pipe to another pipe or to another connecting member.

9 Claims, 5 Drawing Sheets

APPARATUS FOR HOLDING AND POSITIONING A PIPE DURING INSTALLATION

RELATIONSHIP TO PRIOR APPLICATION

This is a U.S. non-provisional application relating to and claiming the benefit of U.S. Provisional Patent Application Ser. No. 60/463,303, filed Apr. 15, 2003.

BACKGROUND OF THE INVENTION

This invention relates to the installation of pipe; more particularly it relates to an apparatus which allows a single installer to install pipe. Drainpipe, water pipe and HVAC duct or pipe used in new construction or remodeling comes in long sections which must be pieced together. PVC drainpipe is often five (5) inches in diameter or larger, twenty (20) feet long and can weigh over one hundred (100) pounds. The installation of these long links of pipe normally requires two persons. One person holds the far end of the pipe adjacent to the ceiling while the other person attaches the other end of the pipe to a previously installed pipe. This adds to the labor costs involved in the installation of pipe.

U.S. Pat. No. 5,024,403 issued to Carlston shows a device for assisting in the hanging of pipe in the form of a thin, narrow rectangular plate having sharp ends. The plate is adapted to be wedged between adjacent ceiling joists. Wedging is accomplished by hammering the plate so that the sharp ends bite into the ceiling joists. The free end of the pipe is placed between the ceiling joists and is supported by the plate to aid in the installation of the pipe. The use of the Carlston invention pre-supposes that the pipe is to be installed between adjacent ceiling joists, rather than under the ceiling joists. In addition, the Carlston device causes damage to the ceiling joists. Lastly, removal of the support plate from between the ceiling joists by a hammer can cause damage to the pipe.

BRIEF SUMMARY OF THE INVENTION

In accordance with one form of this invention, there is provided an apparatus for enabling an elongated pipe to be installed below a ceiling using a single installer. A first jaw is provided and is adapted to temporarily support one end of the pipe. A fastener is provided for removably securing the apparatus to the ceiling. An extension device is provided for connecting the jaw to the fastener so that one end of the pipe may be temporarily supported at a distance from the ceiling and the installer may connect the other end of the pipe to another pipe.

In accordance with another form of this invention, there is provided a method for installing pipe below a ceiling using a single installer and utilizing an apparatus, including a first jaw, a fastener and an extension device connecting the first jaw to the fastener. The method includes the steps of attaching the apparatus to the ceiling using the fastener, placing one end of the pipe in the jaw so that one end of the pipe becomes suspended from the ceiling, and attaching the other end of the pipe to a previously installed pipe or to another connecting member.

BRIEF DESCRIPTION OF THE DRAWINGS

The subject matter which is regarded as the invention is set forth in the appended claims. The invention itself, however, together with other objects and advantages thereof may be better understood taken in conjunction with the accompanying drawings in which:

DESCRIPTION OF THE PREFERRED EMBODIMENTS

Figure 1:
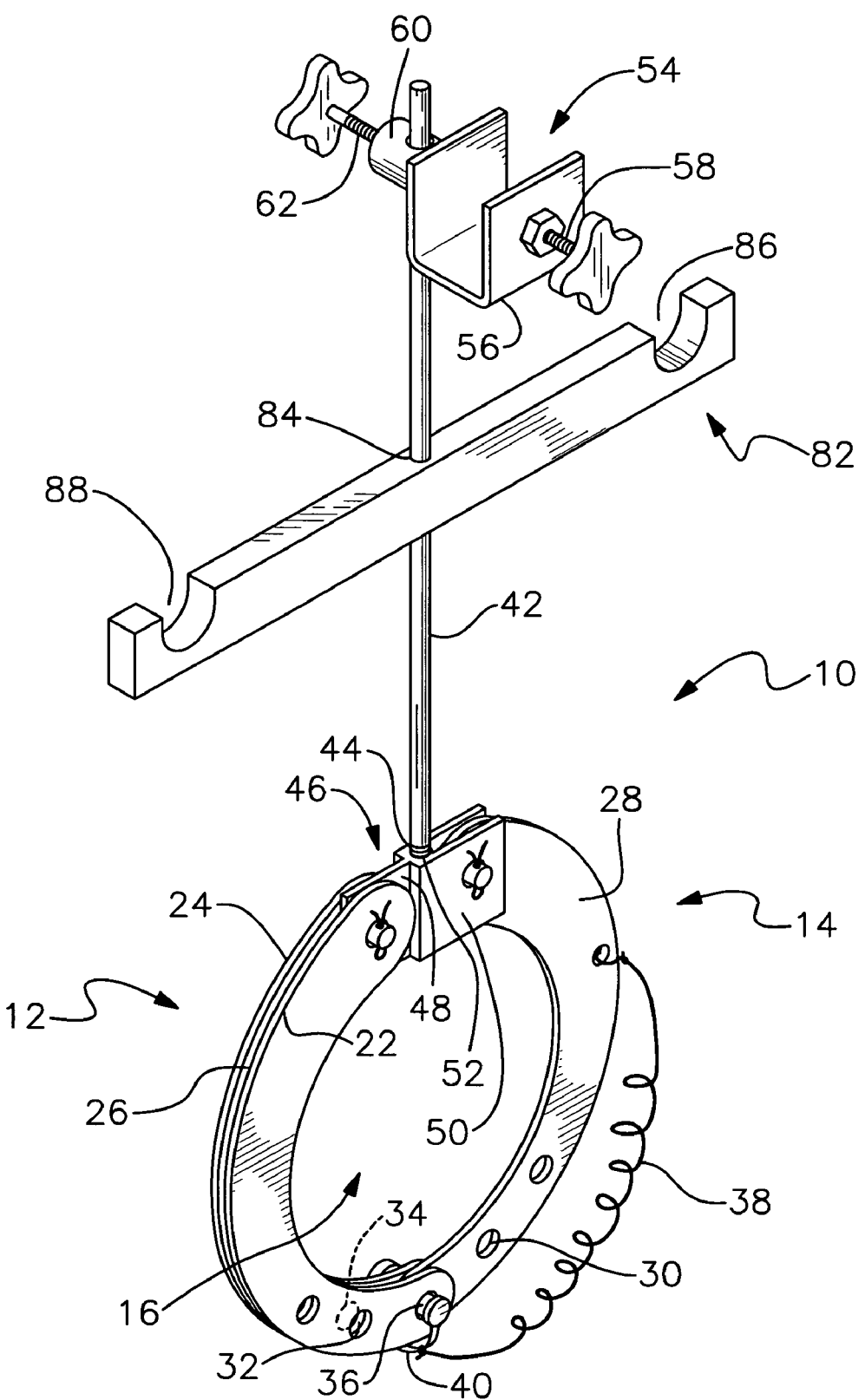
FIG. 1 is a perspective view showing one embodiment of the invention with the jaws in the closed position.
Figure 4:
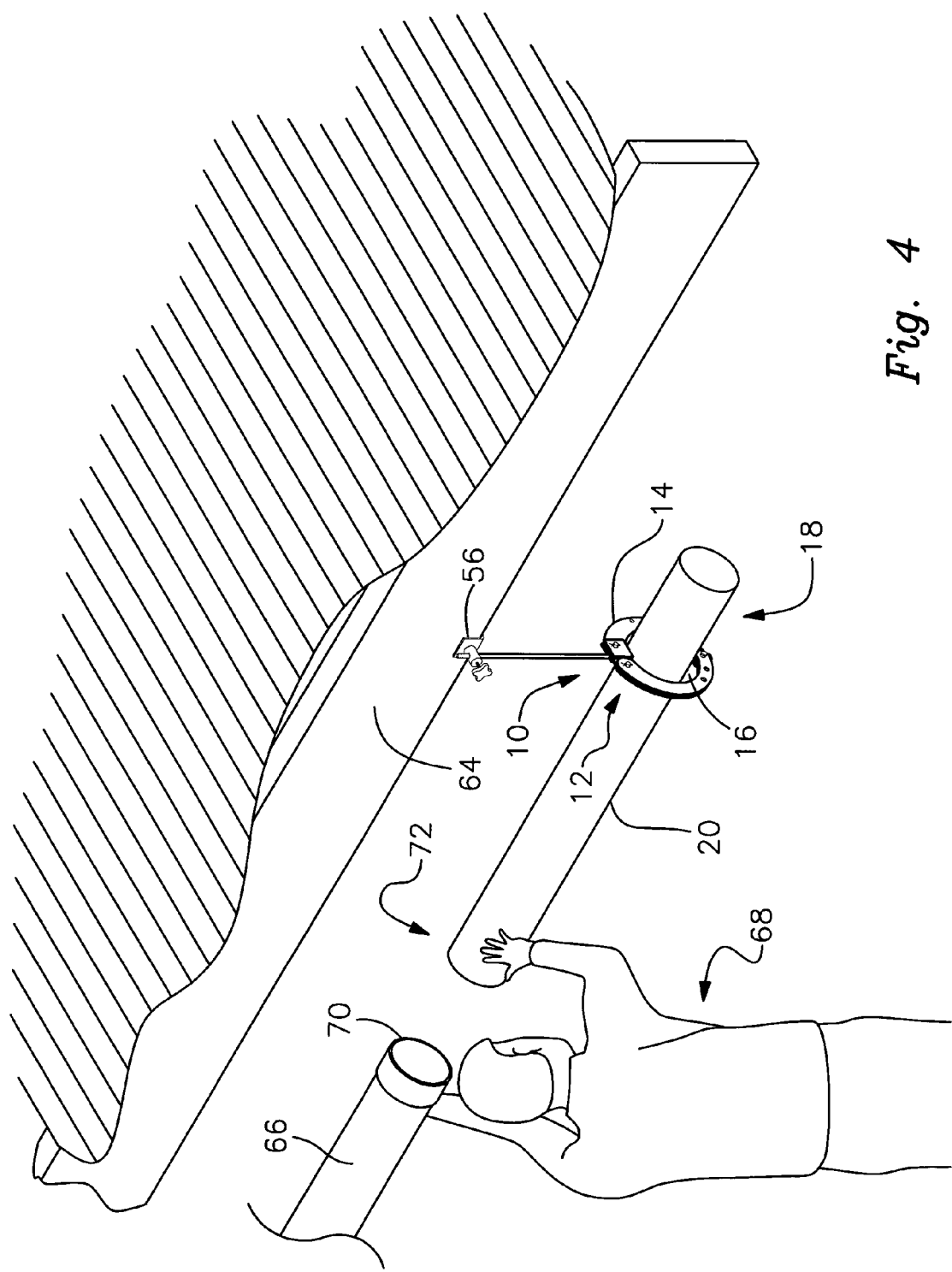
FIG. 4 is a pictorial view showing the use of the pipe hanger of FIG. 1.
Figure 6:
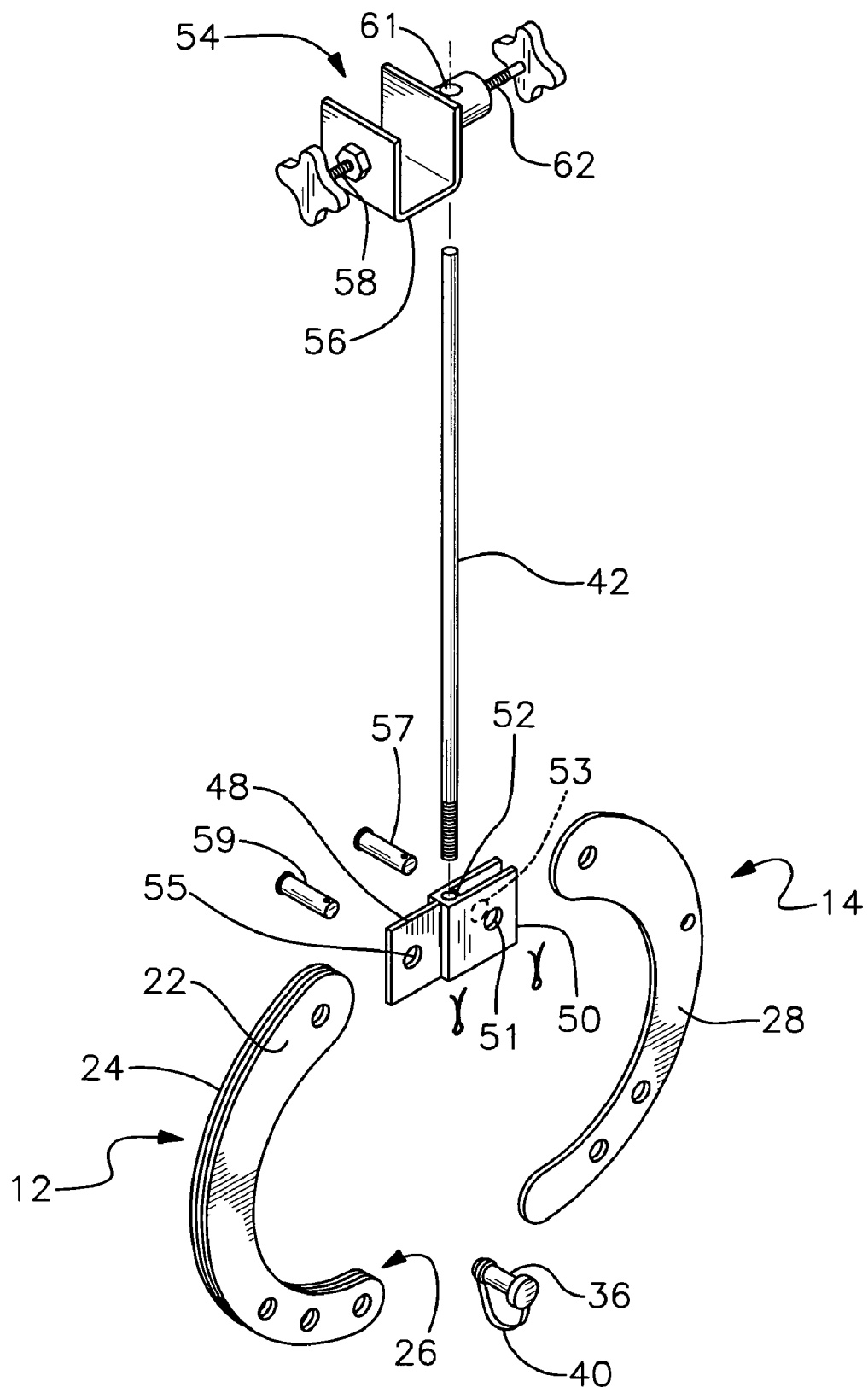
FIG. 6 shows an exploded view of the apparatus shown in FIG. 3 but with the chain omitted.

Referring now more particularly to FIG. 1, there is provided pipe hanger 10 having a pair of rotatable jaws 12 and 14 each having first and second ends. As shown in FIG. 1, jaws 12 and 14 are in the closed position, forming an enclosed space 16 which is adapted to receive one end 18 of elongated plastic drainpipe 20 as shown in FIG. 4.

Figure 2:
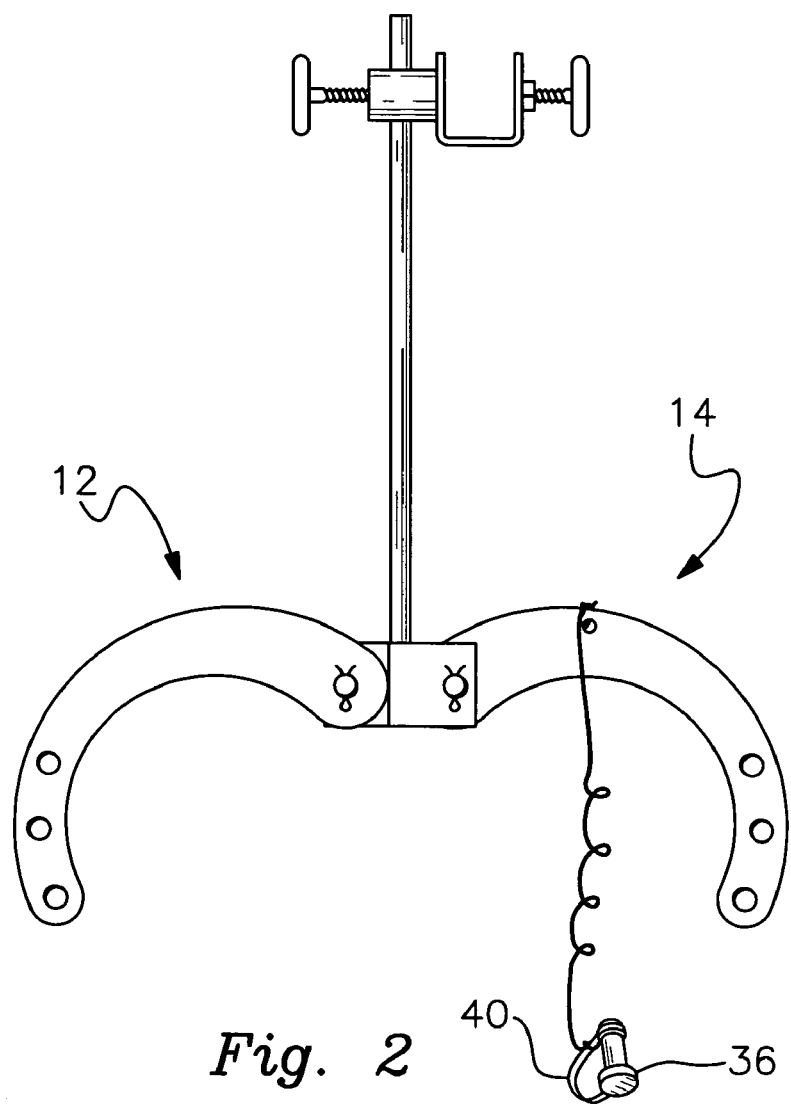
FIG. 2 shows a portion of the embodiment of FIG. 1 with the jaws in the open position.
Figure 3:
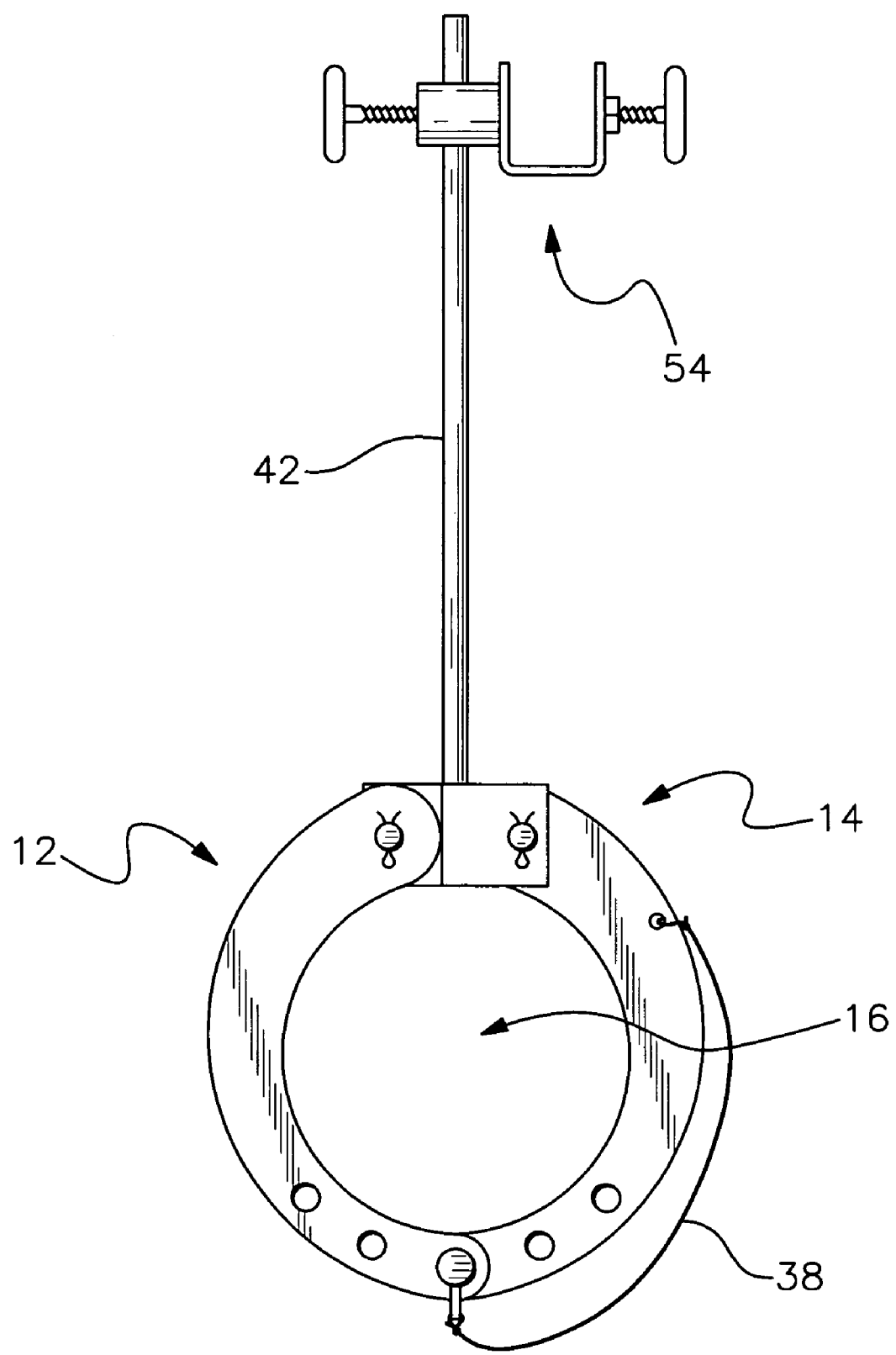
FIG. 3 is a front elevational view of the embodiment of FIG. 1 with the water pipe holder removed.

As shown in FIG. 2, jaws 12 and 14 are in the open position so that the pipe may be attached to the hanger 10 without the need to pass end 18 of the pipe through opening 16. Jaw 12 is bifurcated; that is jaw 12 includes a first semi-circular curved element 22 and second semi-circular curved element 24. Gap 26 is formed between curved elements 22 and 24. Jaw 14 includes a single semi-circular curved element 28, portions of which are adapted to be received within a portion of gap 26 when the jaws are in a closed position as illustrated by FIG. 1 and FIG. 3.

A plurality of holes 32 are drilled through curved element 22 and a plurality of holes 34 are drilled through curved element 24. Pin 36 is attached to curved element 28 by a chain 38. Pin locking spring element 40 is attached to pin 36. The jaws 12 and 14 are held in the closed position and locked about pipe 20 by inserting pin 36 through the aligned holes 30, 32 and 34 of the respective curved elements so that the jaws are removably connected to one another. By utilizing more than one hole through each of the curved elements, the diameter of the circular space 16 is made adjustable so as to accommodate various diameters of pipe.

The hanger further includes an extension device which preferably is in the form of elongated rod 42. Rod 42 includes threads 44 located at the lower end. The hanger 10 further includes connection member 46, including a first plate 48 and a second plate 50. A threaded channel 52 extends between plates 48 and 50 and is adapted to receive and engage with threads 44 on rod 42. Curved elements 22 and 24 are rotatably attached to plate 48 and curved element 28 is rotatably attached to plate 50 by means of holes 51, 53 and 55 through the respective plates and curved elements with pins 57 and 59 being placed there through. The threads 44 enable one to make minor vertical adjustments to the position of jaws 12 and 14 and thus, the vertical position of opening 16 by rotating the jaws about the axis of rod 42.

A fastener, preferably in the form of clamp member 54, is attached to rod 42 towards the top of the rod. Clamp member 54 includes "C" clamp 56 having first setscrew 58 attached thereto. "C" clamp 56 is also attached to boss 60. Boss 60 includes a hole 61 there through for receiving a rod 42. Second setscrew 62 is attached to boss 60 and is able to make contact with rod 42 to hold clamp member 54 in place on the rod. This arrangement also enables jaws 12 and 14 and thus, pipe receiving opening 16 to be adjusted vertically along the length of rod 42 so as to enable major vertical adjustments. "C" clamp as shown in FIG. 4, is adapted to engage with ceiling joist 64. Setscrew 58 holds the "C" clamp and thus, hanger 10 firmly to ceiling joist 64.

The hanger 10 is operated as follows:

the vertical distance between previously installed pipe 66 as shown in FIG. 4 and ceiling joist 64 is measured or estimated by installer 68;

installer 68 then attaches hanger 10 to ceiling joist 64 by means of clamp member 54 at a distance from the free end 70 of a preinstalled pipe 66 of slightly less than the length of pipe 20;

in order for pipe 20 to be installed in the proper position, the distance between opening 16 of pipe hanger 10 and ceiling joist 64 is made equal to the distance between pipe 66 and ceiling joist 64 by moving rod 42 through opening 61 in boss 60 and its position is then fixed by tightening setscrew 62 on to rod 42;

finer height adjustments may be done by rotating jaws 12 and 14 about the axis of rod 42 so that they move up rod 42 due to threads 44;

installer 68 then adjusts the diameter of opening 16 by moving rotatable jaws 12 and 14 to the appropriate position and aligning holes 30, 32 and 34 and inserting rod 36 there through so that the diameter of opening 16 is slightly larger than the diameter of pipe 20;

installer 68 may then place the end 18 of pipe 20 through opening 16 between jaws 12 and 14 of hanger 10 (alternatively, the installer may first open the jaws 12 and 14 as shown in FIG. 2, place pipe 20 between the open jaws, and then close and fix the jaws as shown in FIG. 1); and installer 68 then places the end 72 of pipe 20 against end 70 of fixed pipe 66. Normally one end of one of the pipes is bell-shaped while the other end is a spigot so that the spigot end fits into the bell end. The installer may then glue or otherwise attach the pipes together. The installer then applies a permanent strap between end 18 of pipe 20 and ceiling joist 64. Pipe holder 10 is then removed from pipe 20 and the ceiling joist by the installer by removing pin 36 and opening the jaws as shown in FIG. 2 and then releasing the "C" clamp 54 from the ceiling joist by rotating the setscrew 58 in the counter-clockwise direction. Thus, pipe 20 may be installed by a single person.

Figure 5:
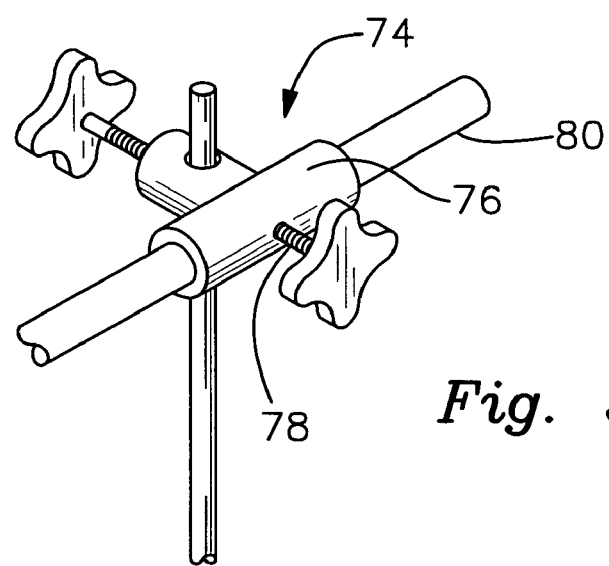
FIG. 5 shows a portion of an alternative embodiment of the invention.

In the embodiment of FIG. 5, "C" clamp 56 from FIG. 1 is replaced with an "O" clamp 74. The "O" clamp includes a hollow pipe structure 76 having a setscrew 78 received therein. Pipe structure 76 is adapted to receive a small pipe 80. This "O" clamp structure enables one to use this pipe hanger 10 in situations where there are spaced apart bar joists just below the ceiling. That is, pipe 80 is placed between the spaced apart bar joists and supported thereby.

Hanger 10 may also include water pipe support bracket 82 having hole 84 there through for receiving rod 42. Water pipe bracket 82 includes a first groove 86 for receiving and supporting a hot water pipe and a second groove 88 for receiving and supporting a cold water pipe. Thus, installer 68 may also use pipe hanger 10 to install hot and cold water pipes using the same techniques as used in the installation of drainpipe 20 as described above.

From the foregoing description of the embodiments of the invention, it will be apparent that many modifications may be made therein. It will be understood, however, that these embodiments of the invention are exemplifications of the invention only and that the invention is not limited thereto.

What is claimed is:

1. An apparatus for enabling an elongated pipe to be installed below a ceiling using a single installer comprising:
   a first jaw; said jaw adapted to temporarily support one end of said pipe;
   a fastener; said fastener for removably securing the apparatus to the ceiling; and
   an extension device; said extension device connecting said jaw to said fastener;
   whereby one end of said pipe may be temporarily supported at a distance from the ceiling so that the installer may attach the other end of said pipe to another pipe or to another connecting member;
   a second jaw; at least one of said jaws being rotatable;
   a connection member; each jaw being curved and each jaw having a first end and a second end; said first ends of each jaw connected to said connection member; said second ends of each jaw removably connected to one another;
   said first jaw being bifurcated and including a pair of curved elements forming a gap; said second end of said second jaw received in said gap at the second end of said first jaw when said jaws are closed; and
   a plurality of holes near said second end of said second jaw and in said curved elements near said second end of said first jaw; predetermined holes in said second jaw adapted to align with predetermined holes in said first jaw; two of said aligned holes removably receiving a pin whereby the jaws may be fixed with a predetermined circumference corresponding to the circumference of a particular pipe.

2. An apparatus as set forth in claim 1, wherein said fastener includes a clamp.

3. An apparatus as set forth in claim 1, wherein said clamp is a "C" clamp; said "C" clamp adapted to be fastened to a ceiling joist.

4. An apparatus as set forth in claim 1, wherein said clamp is an "O" clamp; said "O" clamp adapted to be fastened to a pipe located below the ceiling.

5. An apparatus as set forth in claim 2, wherein said fastener includes a boss having a hole there through for slidably receiving said extension device whereby the distance from the ceiling to said jaw may be adjusted.

6. An apparatus as set forth in claim 1, wherein said connection member includes a threaded hole for receiving one end of said extension device; said one end of said extension device being threaded whereby fine adjustments for the distance between said ceiling and said jaws may be made.

7. An apparatus as set forth in claim 1, wherein said extension device is in the form of an elongated rod.

8. An apparatus as set forth in claim 1, including a water pipe support bracket; said bracket including a hole there through for receiving said extension device; said bracket located between said jaw and said fastener.

9. An apparatus as set forth in claim 8, wherein said bracket includes a pair of grooves therein for receiving a pair of water pipes.

* * * * *